United States Patent
Park et al.

(10) Patent No.: US 10,153,877 B2
(45) Date of Patent: Dec. 11, 2018

(54) METHOD AND APPARATUS FOR TRANSMITTING FEEDBACK FRAME IN WIRELESS LOCAL AREA NETWORK SYSTEM

(71) Applicant: LG ELECTRONICS INC., Seoul (KR)

(72) Inventors: Eunsung Park, Seoul (KR); Jinsoo Choi, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 15/296,997

(22) Filed: Oct. 18, 2016

(65) Prior Publication Data
US 2017/0111148 A1    Apr. 20, 2017

Related U.S. Application Data

(60) Provisional application No. 62/243,616, filed on Oct. 19, 2015.

(51) Int. Cl.
*H04L 5/00* (2006.01)
*H04W 72/12* (2009.01)
*H04W 84/12* (2009.01)

(52) U.S. Cl.
CPC ........... *H04L 5/0048* (2013.01); *H04W 84/12* (2013.01)

(58) Field of Classification Search
CPC ... H04L 5/0048; H04L 5/0053; H04L 5/0057; H04L 5/0007; H04L 5/001; H04W 72/1226; H04W 72/1278; H04W 72/1284; H04W 72/0453; H04W 84/12; H04B 7/0417; H04B 7/063; H04B 7/0452
See application file for complete search history.

(56) References Cited

U.S. PATENT DOCUMENTS

2006/0223476 A1* 10/2006 Song .................... H04B 7/0811
                                                              455/277.2
2007/0298742 A1* 12/2007 Ketchum ............. H04B 7/0617
                                                              455/186.1

(Continued)

*Primary Examiner* — Hoang-Chuong Q Vu
(74) *Attorney, Agent, or Firm* — Lee, Hong, Degerman, Kang & Waimey

(57) ABSTRACT

Provides are a method and an apparatus for transmitting a feedback frame in a wireless local area network (WLAN) system. Specifically, a station (STA) receives, from an access point (AP), a null data packet announcement (NDPA) frame indicating transmission of a null data packet (NDP). The STA receives the NDP from the AP. The STA transmits, to the AP, a feedback frame including channel state information determined based on the NDP. The channel state information indicates a feedback subcarrier in each subcarrier group. The subcarrier group is generated based on grouping information using subcarriers in a frequency band excluding a guard subcarrier and a DC subcarrier. The feedback subcarrier is included in a subcarrier with an odd-numbered subcarrier index. The feedback subcarrier corresponds to a subcarrier with an even-numbered subcarrier index that is adjacent to the subcarrier with the odd-numbered subcarrier when the subcarrier with the odd-numbered subcarrier is a null subcarrier.

14 Claims, 14 Drawing Sheets

(56) References Cited

U.S. PATENT DOCUMENTS

| | | | |
|---|---|---|---|
| 2015/0236833 A1* | 8/2015 | Dayal | H04L 5/0051 370/315 |
| 2016/0066321 A1* | 3/2016 | Yu | H04L 5/00 370/329 |
| 2016/0119047 A1* | 4/2016 | Lee | H04B 7/0617 370/329 |
| 2016/0204960 A1* | 7/2016 | Yu | H04L 25/0202 370/338 |
| 2016/0295513 A1* | 10/2016 | Moon | H04L 5/0023 |
| 2017/0054586 A1* | 2/2017 | Lin | H04L 27/2613 |
| 2017/0093478 A1* | 3/2017 | Yu | H04B 7/0684 |
| 2017/0338927 A1* | 11/2017 | Park | H04L 5/0051 |
| 2018/0205442 A1* | 7/2018 | Oteri | H04B 7/0417 |

\* cited by examiner

FIG. 1
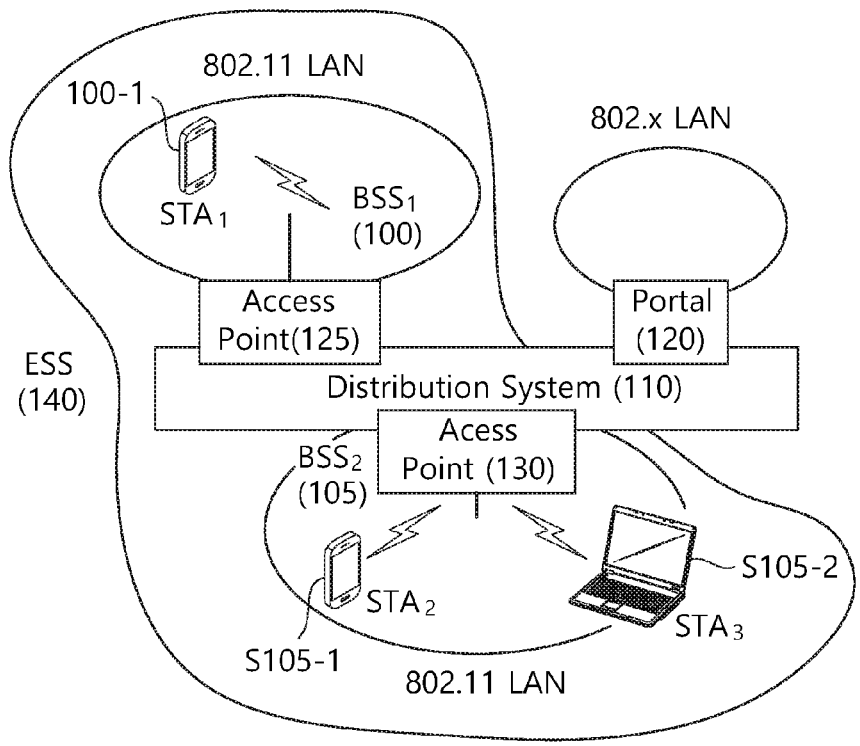
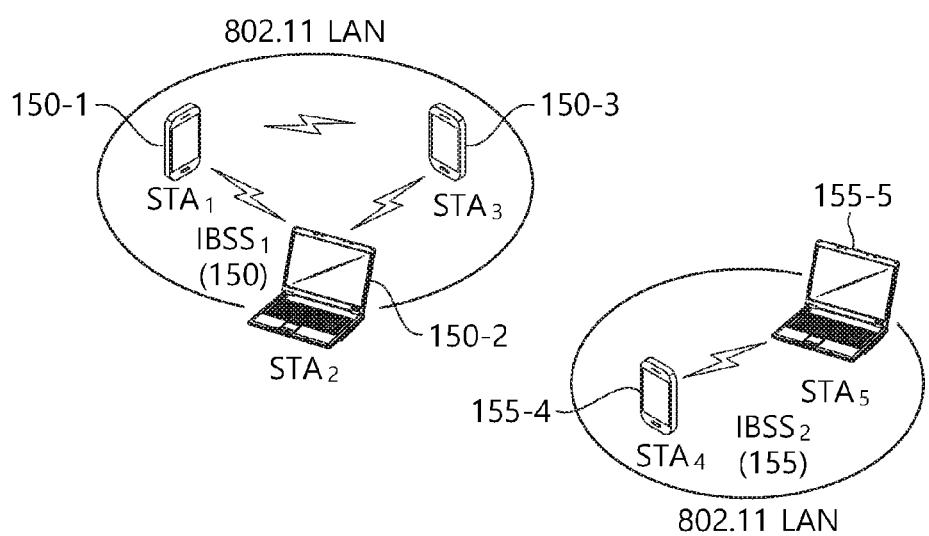

METHOD AND APPARATUS FOR TRANSMITTING FEEDBACK FRAME IN WIRELESS LOCAL AREA NETWORK SYSTEM

CROSS-REFERENCE TO RELATED APPLICATION

Pursuant to 35 U.S.C. § 119(e), this application claims the benefit of U.S. Provisional Patent Application No. 62/243,616, filed on Oct. 19, 2015, the contents of which are hereby incorporated by reference herein in its entirety.

BACKGROUND OF THE INVENTION

Field of the Invention

The present invention relates to wireless communications, and more particularly, to a method of transmitting a feedback frame in a wireless local area network (WLAN) system and an apparatus using the same.

Description of the Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

An aspect of the present specification is to provide a method of transmitting a feedback frame in a wireless local area network (WLAN) system and an apparatus using the same.

The present specification proposes a method of transmitting a feedback frame based on a sounding procedure in a WLAN system.

First, a station (STA) receives, from an access point (AP), a null data packet announcement (NDPA) frame that indicates the transmission of an NDP.

The STA receives the NDP from the AP.

The STA transmits, to the AP, a feedback frame including channel status information determined based on the NDP.

The channel state information indicates a feedback subcarrier in each subcarrier group. That is, the channel state information indicates a location to which the feedback subcarrier in a frequency band is allocated.

Specifically, the subcarrier group is generated based on grouping information using subcarriers in a frequency band excluding a guard subcarrier and a DC subcarrier. The grouping information may correspond to Ng. That is, the subcarriers in the frequency band form groups in Ng excluding the guard subcarrier and the DC subcarrier.

The feedback subcarrier is included in a subcarrier with an odd-numbered subcarrier index. Further, a pilot subcarrier is included in a subcarrier with an even-numbered subcarrier index. Since a pilot subcarrier has an even-numbered subcarrier index in the 802.11ax system, a feedback subcarrier basically has an odd-numbered index so as not to overlap with the pilot subcarrier. Here, if the subcarrier with the odd-numbered subcarrier index is a null subcarrier, the feedback subcarrier corresponds to a subcarrier with an even-numbered subcarrier index, which is adjacent to the subcarrier with the odd-numbered subcarrier index. That is, in this case, it does not matter if the feedback subcarrier has an even-numbered subcarrier index.

Further, if the subcarrier with the odd-numbered subcarrier index is a null subcarrier, the feedback subcarrier is included in a subcarrier group generated by grouping the subcarrier group and an adjacent subcarrier group. That is, the subcarrier group including the null subcarrier is combined with a subcarrier group adjacent to the subcarrier group including the null subcarrier to form one new group. That is, in this case, the feedback subcarrier is included in the new on group.

Further, the channel state information includes average channel information estimated in subcarriers, excluding the null subcarrier and the pilot subcarrier, in the subcarrier group or channel information estimated in the feedback subcarrier. That is, since the former feeds back an average channel information value of all subcarriers (excluding the null subcarrier and pilot subcarrier) in the subcarrier group, a smoothing effect may be obtained to improve performance. Since the latter feeds only the channel information estimated in the feedback subcarrier, it is not necessary to obtain an average channel information value of all subcarriers, thus reducing overhead of computation quantity. The channel state information is transmitted through the feedback subcarrier.

Further, the grouping information is received through the NDPA frame.

Further, the NDP includes a first field area and a second field area. The second field area may include all or some of an HE-STF, an HE-LTF, or the like. The first field area may include all or some fields preceding the HE-STF. For example, the first field area may include an L-LTF, and the second field area may include an HE-LTF. The size of an IFFT applied to the second field area may be twice or four times larger than that of an IFFT applied to the first field area. That is, the foregoing method may use a 2×-LTF or 4×-LTF-applied NDP to perform a sounding procedure.

Further, the present specification proposes an apparatus for transmitting and receiving a traffic stream in a WLAN system. The apparatus may correspond to an STA, a beamformee, or the like, without being limited thereto.

The apparatus includes a radio frequency (RF) unit to transmit and receive a radio signal and a processor operatively coupled with the RF unit.

The processor receives, from an AP, an NDPA frame indicating the transmission of an NDP.

The processor receives the NDP from the AP.

The processor transmits, to the AP, a feedback frame including channel state information determined based on the NDP.

The channel state information indicates a feedback subcarrier in each subcarrier group. That is, the channel state information indicates a location to which the feedback subcarrier in a frequency band is allocated.

Specifically, the subcarrier group is generated based on grouping information using subcarriers in a frequency band excluding a guard subcarrier and a DC subcarrier. The grouping information may correspond to Ng. That is, the subcarriers in the frequency band form groups in Ng excluding the guard subcarrier and the DC subcarrier.

The feedback subcarrier is included in a subcarrier with an odd-numbered subcarrier index. Further, a pilot subcarrier is included in a subcarrier with an even-numbered subcarrier index. Since a pilot subcarrier has an even-numbered subcarrier index in the 802.11ax system, a feedback subcarrier basically has an odd-numbered index so as not to overlap with the pilot subcarrier. Here, if the subcarrier with the odd-numbered subcarrier index is a null subcarrier, the feedback subcarrier corresponds to a subcarrier with an even-numbered subcarrier index, which is adjacent to the subcarrier with the odd-numbered subcarrier index. That is, in this case, it does not matter if the feedback subcarrier has an even-numbered subcarrier index.

Further, if the subcarrier with the odd-numbered subcarrier index is a null subcarrier, the feedback subcarrier is included in a subcarrier group generated by grouping the subcarrier group and an adjacent subcarrier group. That is, the subcarrier group including the null subcarrier is combined with a subcarrier group adjacent to the subcarrier group including the null subcarrier to form one new group. That is, in this case, the feedback subcarrier is included in the new on group.

Further, the channel state information includes average channel information estimated in subcarriers, excluding the null subcarrier and the pilot subcarrier, in the subcarrier group or channel information estimated in the feedback subcarrier. That is, since the former feeds back an average channel information value of all subcarriers (excluding the null subcarrier and pilot subcarrier) in the subcarrier group, a smoothing effect may be obtained to improve performance. Since the latter feeds only the channel information estimated in the feedback subcarrier, it is not necessary to obtain an average channel information value of all subcarriers, thus reducing overhead of computation quantity. The channel state information is transmitted through the feedback subcarrier.

Further, the grouping information is received through the NDPA frame.

Further, the NDP includes a first field area and a second field area. The second field area may include all or some of an HE-STF, an HE-LTF, or the like. The first field area may include all or some fields preceding the HE-STF. For example, the first field area may include an L-LTF, and the second field area may include an HE-LTF. The size of an IFFT applied to the second field area may be twice or four times larger than that of an IFFT applied to the first field area. That is, the foregoing method may use a 2×-LTF or 4×-LTF-applied NDP to perform a sounding procedure.

When the beamformee calculates the average channel value in the group and feeds back channel information, a smoothing effect may be obtained to improve performance. In addition, when the beamformee feeds only the channel information estimated in the feedback subcarrier, overhead of computation quantity may be reduced, thus being advantageous as compared with the 802.11ac method. Accordingly, efficient communication may be performed.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
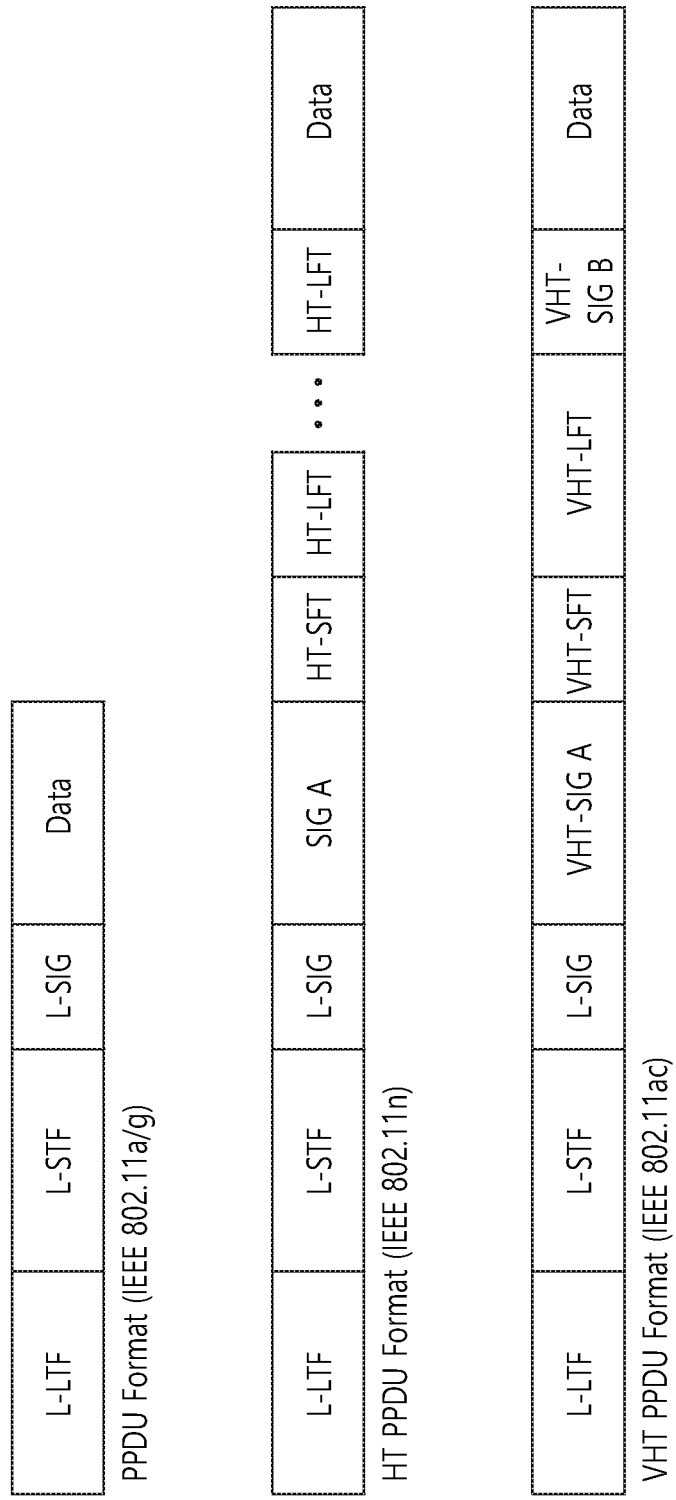
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively.

However, the improved signal proposed in the embodiment is not particularly limited to an HE-SIG-A and/or HE-SIG-B standard and may be applied to control/data fields having various names, which include the control information in a wireless communication system transferring the user data.

Figure 3:
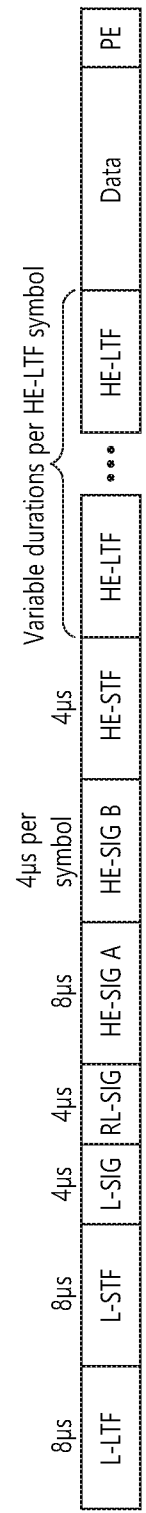
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
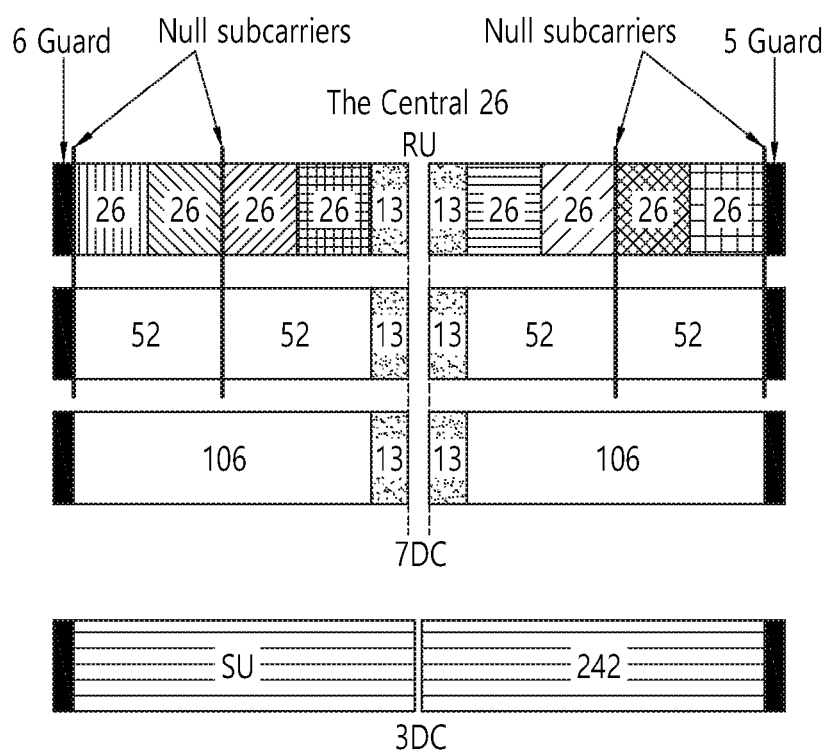
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
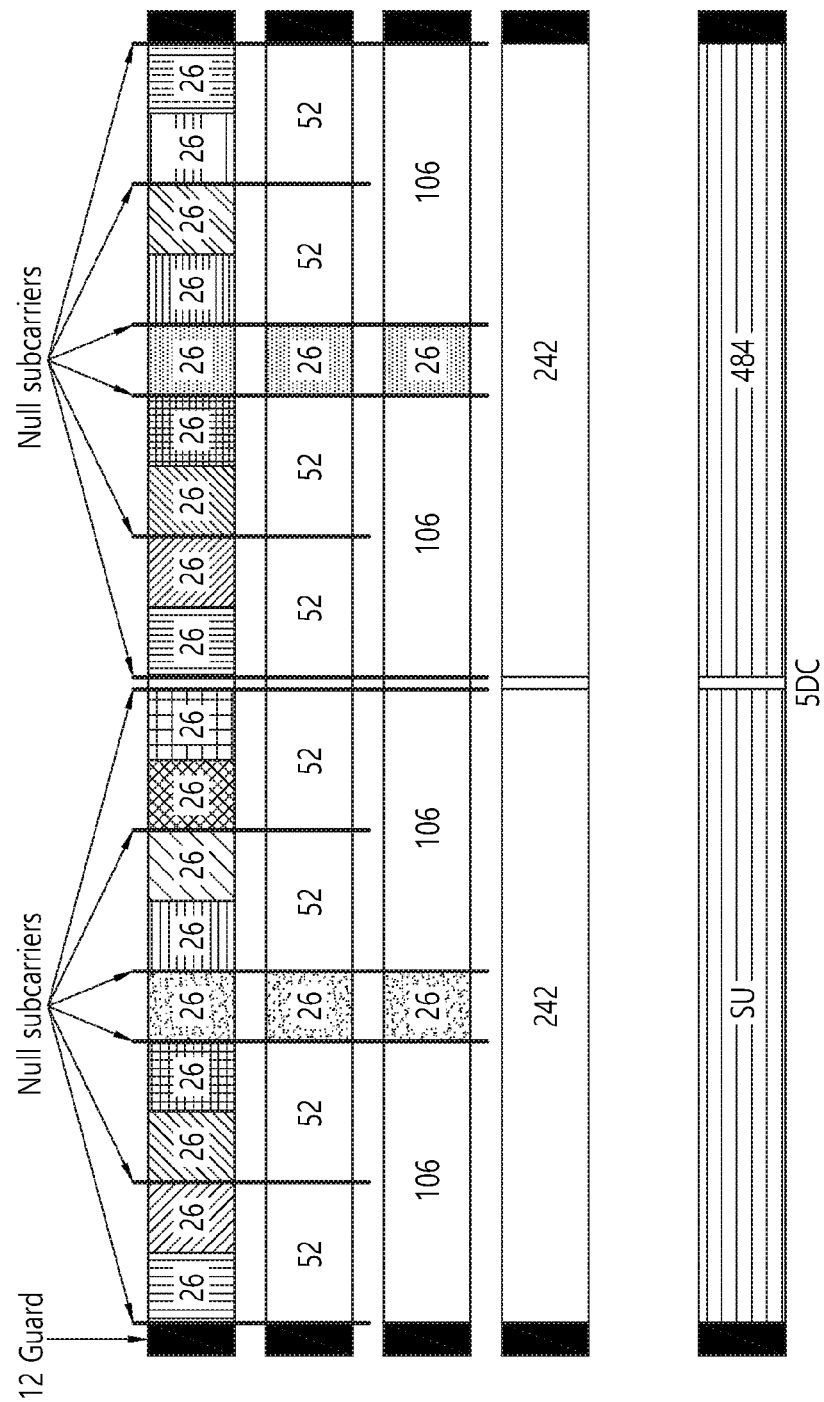
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
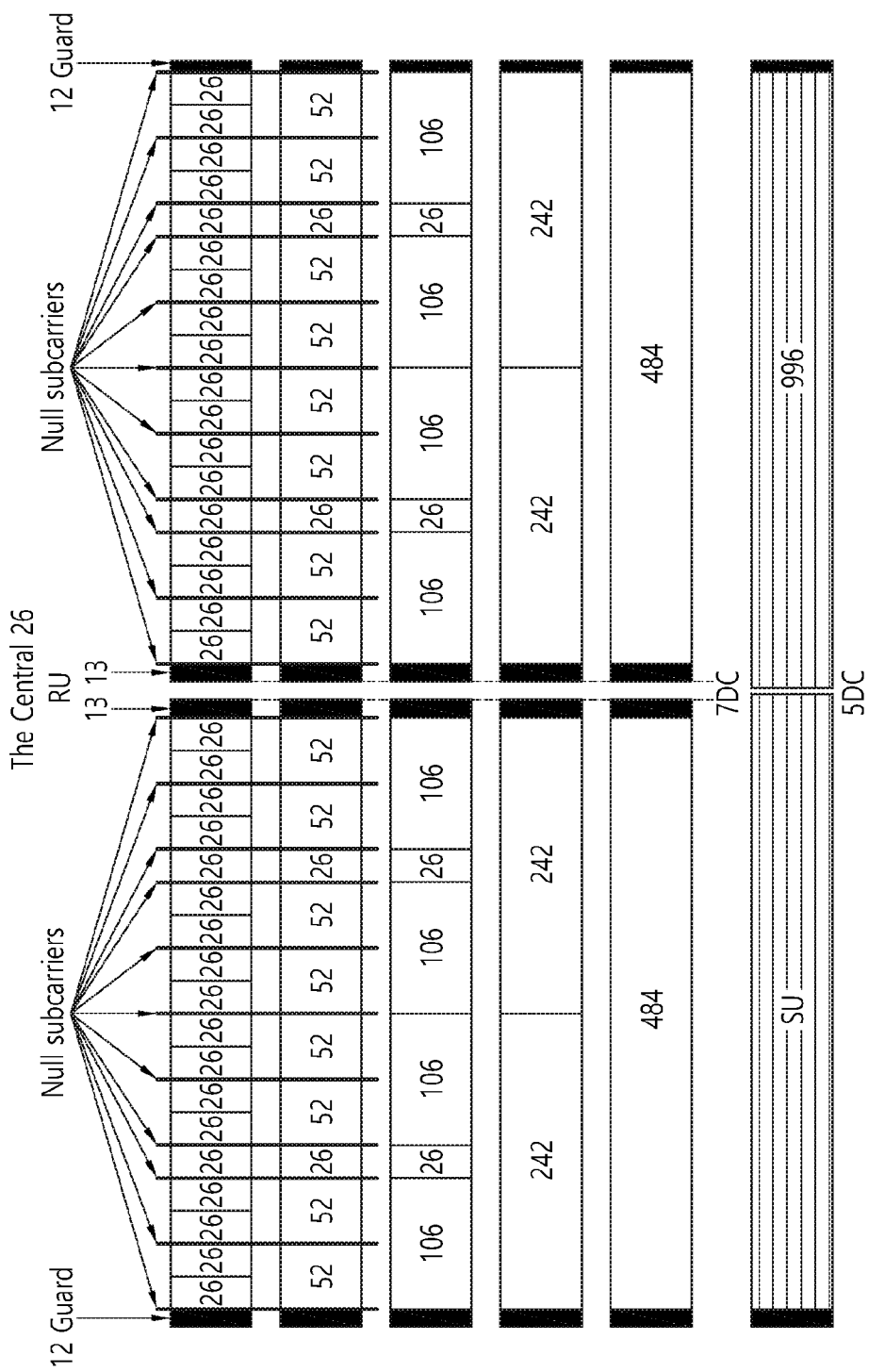
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
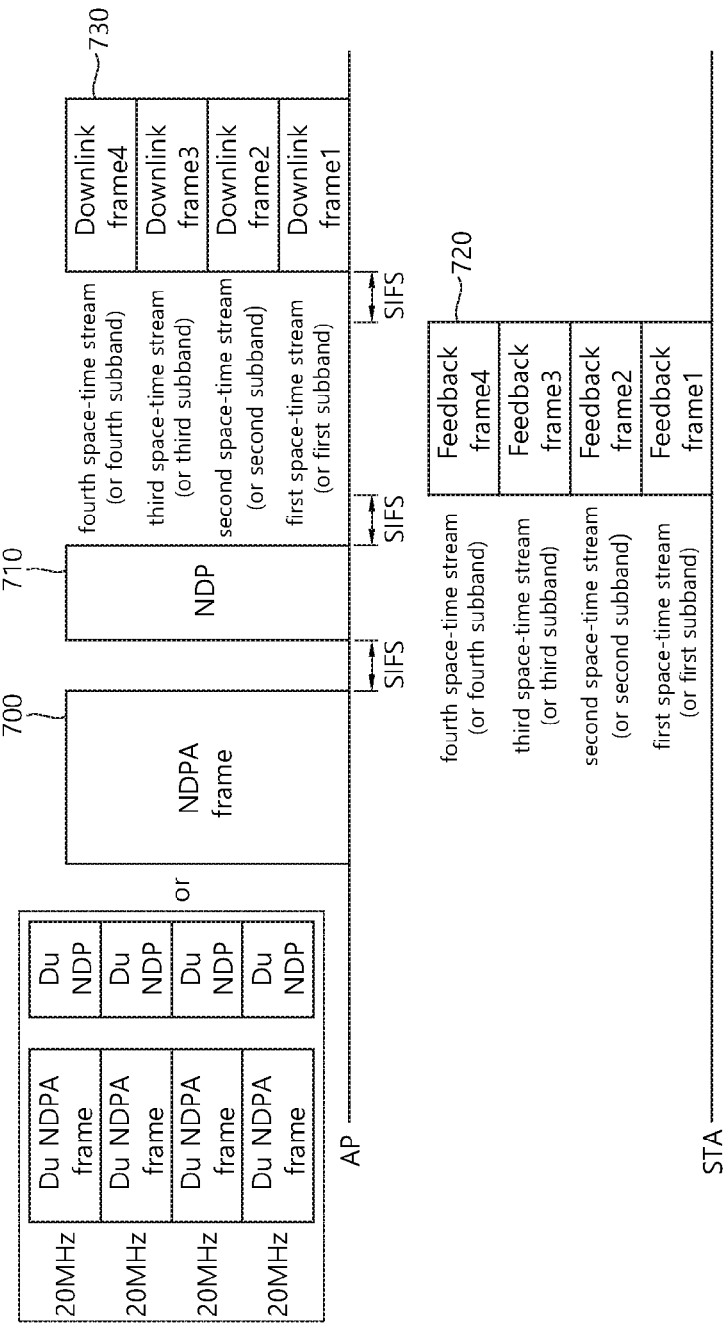
FIG. 7 is a concept view illustrating a method of transmitting a frame on the basis of a sounding procedure according to an embodiment of the present invention.

FIG. 7 is a concept view illustrating a method of transmitting a frame on the basis of a sounding procedure according to an embodiment of the present invention.

Disclosed in FIG. 7 is a method of transmitting a frame on the basis of a sounding procedure for a single STA. The sounding procedure may be a procedure for acquiring channel state information. More specifically, disclosed is a method in which an AP performs the sounding procedure with respect to the STA, and transmits a downlink frame to the STA through SU-MIMO (or OFDMA) or MU-MIMO according to feedback information acquired on the basis of the sounding procedure.

The AP may transmit a null data packet announcement (NDPA) frame 700 to the STA for the sounding procedure, and may transmit an NDP 710 after a specific time (e.g., a short interframe space (SIFS)).

The NDPA frame 700 may be used to report to the STA that the sounding procedure starts and the NDP 710 is transmitted. The NDPA frame 700 may include an STA information field. The STA information field may indicate an STA for receiving the NDP 710 to be transmitted after the NDPA frame 700 and for transmitting a feedback frame. The STA indicated on the basis of the STA information field may estimate a channel on the basis of the NDP 710 and may transmit a feedback frame 720 including the channel state information to the AP. That is, the STA may determine whether to transmit the feedback frame 720 to the AP by participating in channel sounding on the basis of the STA information field included in the received NDPA frame 700.

The NDP 710 may have a format which includes only a PPDU header by omitting a data field from the typical PPDU. The NDP 710 may be precoded by the AP on the basis of a specific precoding matrix. Upon receiving the NDP 710, the STA may estimate a channel on the basis of a training field (e.g., HE-LTF) of the NDP 710 and may acquire channel state information. Since the NDP 710 does not have the data field, length information indicating a PSDU length included in the data field of the NDP 710 or a length of an aggregate-MAC protocol data unit (A-MPDU) included in the PSDU may be set to 0.

Each of the NDPA frame 700 and the NDP 710 may be transmitted through a full bandwidth for transmission of the NDPA frame 700 and the NDP 710. The PPDU format may be expressed by the term 'non-duplicated PPDU format'.

Alternatively, each of the NDPA frame 700 and the NDP 710 may be transmitted through a plurality of channels on the basis of a duplicate PPDU format. The duplicate PPDU format may be transmitted through a bandwidth greater than 20 MHz (e.g., 40 MHz, 80 MHz, 160 MHz, 80 MHz+80 MHz, etc.) by replicating the PPDU format transmitted through an adjacent channel (or a primary channel) (20 MHz). When a duplicate format 450 is used, the same data may be transmitted through each of a plurality of channels (a replication target channel and a replication channel). That is, an NDPA PPDU (or NDP) may be used based on a duplicate format used to carry replicated information through each of a plurality of channels. The NDPA frame 700 and the NDP 710 having the non-duplicate PPDU format or the duplicate PPDU format may be transmitted to at least one STA through at least one space-time stream. If the AP receives a feedback frame from a single STA as shown in FIG. 7, the AP may transmit the NDPA frame 700 and the NDP 710 to the single STA through at least one stream. If the AP receives the feedback frame from the single STA, the NDPA frame 700 may indicate at least one STA for transmitting the feedback frame. An LTF may be transmitted through at least one space-time stream through the NDP 710, and the STA may transmit to the AP a feedback frame including channel state information measured on the basis of the LTF of an indicated space-time stream and an indicated frequency domain.

Alternatively, the NDPA frame 700 and the NDP 710 may be transmitted based on a DL MU transmission method. More specifically, the NDPA frame 700 and the NDP 710 may be transmitted to a plurality of STAs through different space-time streams on the basis of DL MU MIMO transmission, or may be transmitted to the plurality of STAs through different frequency resources (or a subband, a channel) on the basis of DL MU OFDMA. In this case, the NDPA frame 700 and the NDP 710 transmitted through the different space-time streams or the different frequency resources may include different information. That is, the AP may transmit a plurality of NDPA frames respectively to the plurality of STAs, and may transmit a plurality of NDPs respectively to the plurality of STAs. For example, the NDPA frame transmitted through a specific space-time stream or a specific frequency resource may indicate only a specific STA for transmitting a feedback frame.

Hereinafter, an embodiment of the present invention is described for convenience of explanation by assuming a case where an NDPA frame and an NDP are transmitted to at least one STA through at least one stream on the basis of a non-duplicate PPDU format or a duplicate PPDU format.

The STA may perform channel estimation on the basis of the NDP 710, and may transmit acquired channel state information to the AP through the feedback frame 720. A channel bandwidth used for transmission of the feedback frame 720 may be set to be narrower than or equal to a channel bandwidth used for transmission of the NDPA frame 700. The feedback frame 720 may include channel state information (or stream state information) for each of an indicated space-time stream (or spatial stream).

If the NDP 710 is not transmitted based on beamforming, the feedback frame 720 may include a high throughput (HT) control field and a channel information control field (e.g., very high throughput (VHT) MIMO control field or an HE MU control field). The HT control field may include information regarding Nsts (the number of space-time streams), MCS, bandwidth (BW), and SNR. The control information control field may be reserved.

If the NDP 710 is transmitted based on beamforming, the feedback frame 720 may include an HT control field, a channel information control field, and a channel information field. The HT control field may include information regarding Nsts, MCS, BW, and SNR. The channel control field may include information regarding Nc, Nr, Ng, etc., and/or control information for OFDMA-based transmission. The channel information control field may include SNR information per stream, information of a beamforming feedback matrix for each subcarrier, SNR information for each frequency resource (e.g., subband) in OFDMA-based transmission, etc.

A format of the NDPA frame 700, the NDP 710, and the feedback frame 720 is described later in detail.

According to the embodiment of the present invention, upon receiving the NDAP 710, the STA may transmit the feedback frame 720 to the AP after a specific time (e.g., SIFS). The AP may receive the feedback frame 720, and after the specific time (e.g., SIFS), may transmit a downlink frame 730 to the STA on the basis of SU MIMO (or OFDMA/MU-MIMO). The AP may transmit the downlink frame 730 generated based on channel variation information determined by considering channel state information included in the feedback frame 720.

The STA may transmit an ACK or a block ACK to the AP in response to the received downlink frame 730.

If the downlink frame 730 transmitted by the AP receives the feedback frame 720 and is transmitted after the SIFS, a feedback channel state parameter (e.g., Nsts, MCS, BW, SNR, Nc, Nr, Ng, SNR information per stream, information of a beamforming feedback matrix for each subcarrier, SNR information for each frequency resource (e.g., subband) in OFDMA-based transmission, etc.) is relatively accurate, and thus data transmission efficiency may be increased.

Hereinafter, FIG. 8 to FIG. 10 disclose the NDPA PPDU and NPD 710 for carrying the NDPA frame 700 to perform the sounding procedure and the feedback PPDU for carrying the feedback frame 720 in detail according to an embodiment of the present invention.

Figure 8:
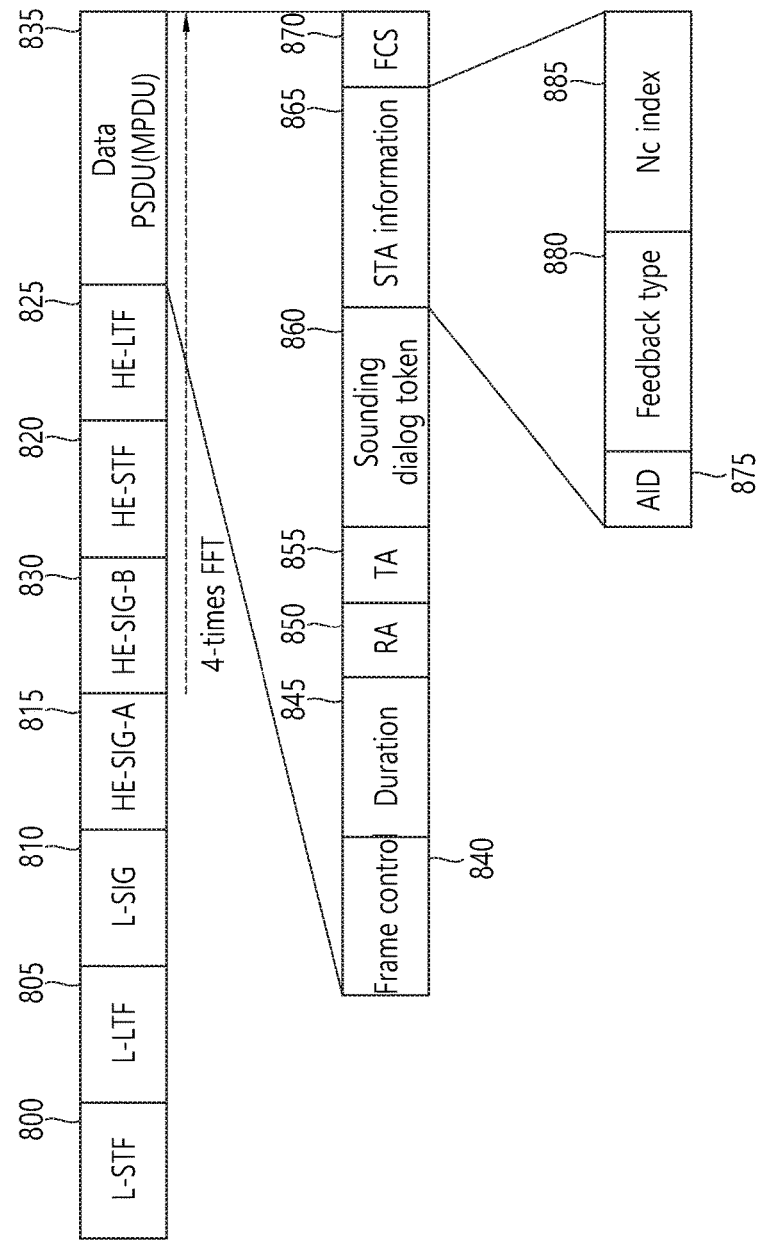
FIG. 8 is a concept view illustrating a format of a null data packet announcement (NDPA) PLCP protocol data unit (PPDU) according to an embodiment of the present invention.

FIG. 8 is a concept view illustrating a format of an NDPA PPDU according to an embodiment of the present invention.

Referring to an upper part of FIG. 8, the NDPA PPDU may include a PPDU header and a PSDU (or MPDU). The PPDU header used herein may include a PHY preamble and a PHY header. A PSDU (or MPDU) of the NPDA PPDU may include an NDPA frame.

The PPDU header of the NDPA PPDU may include a legacy-short training field (L-STF) 800, a legacy-long training field (L-LTF) 805, a legacy-signal (L-SIG) 810, a high efficiency-signal A (HE-SIG A) 815, a high efficiency-signal B (HE-SIG B) 830, a high efficiency-short training field (HE-STF) 820, a high efficiency-long training field (HE-LTF) 825. The PHY header may be divided into a legacy part before the L-SIG 810 and a high efficiency (HE) part after the L-SIG 810.

The L-STF 800 may include a short training orthogonal frequency division multiplexing (OFDM) symbol. The L-STF 800 may be used for frame detection, automatic gain control (AGC), diversity detection, and coarse frequency/time synchronization.

The L-LTF 805 may include a long training OFDM symbol. The L-LTF 805 may be used for fine frequency/time synchronization and channel prediction.

The L-SIG 810 may be used to transmit control information. The L-SIG 810 may include information for a data rate and a data length.

The HE-SIG A 815 may include information indicating an STA for receiving a PPDU. More specifically, the HE-SIG A 815 may include information indicating an STA for receiving an NDPA frame.

In addition, the HE-SIG A 815 may include color bits information for BSS identification information, bandwidth information, a tail bit, a CRC bit, modulation and coding scheme (MCS) information for the HE-SIG B 830, symbol count information for the HE-SIG B 830, and cyclic prefix (CP) (or guard interval (GI)) length information.

The HE-STF 820 may be used to improve automatic gain control estimation in a multiple input multiple output (MIMO) environment or an OFDMA environment.

The HE-LTF 825 may be used to estimate a channel in the MIMO environment or the OFDMA environment.

The HE-SIG B 830 may include a length of physical layer service data unit (PSDU) for each STA, information regarding modulation and coding scheme (MCS), a tail bit, or the like.

A size of inverse fast Fourier transform (IFFT) applied to the HE-STF 820 and a field which comes after the HE-STF 820 may be different from a size of IFFT applied to a field which comes before the HE-STF 820. For example, the size of IFFT applied to the HE-STF 820 and the field which comes after the HE-STF 820 may be four times greater than the size of IFFT applied to the field which comes before the HE-STF 820. The STA may receive the HE-SIG A 815, and may be instructed to receive a downlink PPDU on the basis of the HE-SIG A 815. In this case, the STA may perform decoding on the HE-STF 820 and the field which comes after the HE-STF 820 on the basis of a changed FFT size. On the contrary, if the STA is not instructed to receive the downlink PPDU on the basis of the HE-SIG A 815, the STA may stop decoding and may configure a network allocation vector (NAV). A cyclic prefix (CP) of the HE-STF 820 may have a size greater than a CP of another field, and for this CP duration, the STA may perform decoding on the downlink PPDU by changing the FFT size.

An order of a field constructing the aforementioned NDPA PPDU format may be changed.

For example, an HE-SIG B of an HE part should be located immediately after an HE-SIG A. That is, each field of the HE part may be located in the order of HE-SIG A, HE-SIG B, HE-STF, HE-LTF. The STA may perform decoding on the HE-SIG and up to the HE-SIG B, may receive necessary control information, and may configure an NAV. Likewise, a size of IFFT applied to an HE-STF and a field which comes after the HE-STF may be different from a size of IFFT applied to a field which comes before the HE-STF. The STA may receive the HE-SIG A and the HE-SIG B. If it is instructed to receive the downlink PPDU by the STA identifier field of the HE-SIG A, the STA may perform decoding on the downlink PPDU starting from the HE-STF by changing the FFT size. On the contrary, the STA may receive the HE-SIG A, and if it is not instructed to receive the downlink PPDU on the basis of the HE-SIG A, may configure the NAV.

A PSDU (or MPDU) 835 of the NDPA PPDU may include the NDPA frame. The NDPA frame may include a frame control field 840, a duration field 845, an RA field 850, a TA field 855, a sounding dialog token field 860, an STA information field 865, and an FCS 870.

The frame control field 840 may include a type and subtype for indicating the NDPA frame.

The duration field 845 may include information regarding a duration for protecting transmission of the NDPA frame.

The RA field 850 may include identification information of an STA for receiving the NDPA frame. For example, when the STA information field includes information regarding a single STA, the RA field 850 may include address information of the STA. If the STA information field 865 includes information regarding a plurality of STAs, the RA field 850 may include a broadcast address of the STA. For example, the RA field 850 may include MAC address information of the STA for receiving the NDPA frame.

The TA field 855 may include an address of an AP for transmitting the NDPA frame.

The sounding dialog token field 860 may include information used by the AP for transmitting the NDPA frame to identify the NDPA frame.

The STA information field 865 may include identification information (AID) 875, feedback type information 880, and Nc index information 885 of the STA for receiving the NDPA frame.

Table 1 below discloses information included in the STA information field.

TABLE 1

| Subfield | Description |
| --- | --- |
| AID | AID (assoication identifier) of STA for performing sounding procedure (for receiving NDP to be transmitted later) is included |
| Feedback type | Indicate feedback request type of STA for performing souding procedure<br>Set to '0' in case of SU-MIMO<br>Set to '1' in case of MU-MIMO |
| Nc index | Inidicate requested feedback dimension (information regarding the number of columns of beamforming feedback matrix)<br>In case of MU-MOMO:<br>Set to '0' if Nc = 1<br>Set to '1' if Nc = 2<br>Set to '2' if Nc = 3<br>Set to '3' if Nc = 4<br>Set to '4' if Nc = 5<br>Set to '5' if Nc = 6<br>Set to '6' if Nc = 7<br>Set to '7' if Nc = 8<br>In case of SU-MIMO, reserved subfield (Set to 0) |

In Table 1, Nc may indicate the number of columns of beamforming feedback matrices included in a feedback frame transmitted in response to an NDP.

Upon receiving an NDPA frame, STAs may confirm an AID sub-field value included in an STA information field, and may confirm whether it is a sounding target STA.

FIG. 8 is one example for an NDPA PPDU. The NDPA PPDU may have the legacy PPDU format (e.g., an HT PPDU format, a VHT PPDU format) instead of the HE-SIG A 815, the HE-STF 820, the HE-LTF 825, and the HE-SIG B 830.

Figure 9:
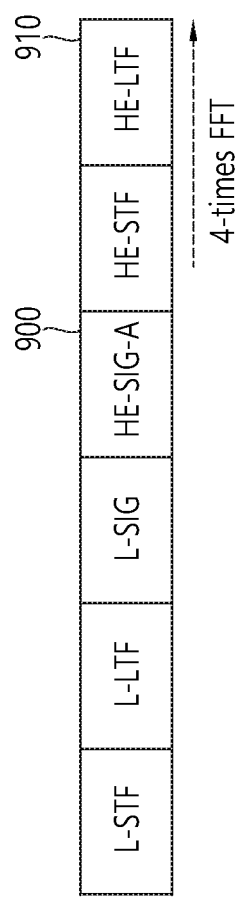
FIG. 9 is a concept view illustrating a null data packet (NDP) according to an embodiment of the present invention.

FIG. 9 is a concept view illustrating an NDP according to an embodiment of the present invention.

Referring to FIG. 9, the NDP may include only a PPDU header except for a PSDU (or MPDU).

As described above, the NDP (or PPDU header) may include a legacy part and a non-legacy part. Each field included in the legacy part and the non-legacy part may perform a role described above in FIG. 8 for transmission of the NDP.

For example, an HE-SIG A 900 may include information indicating an STA for receiving the NDP.

An HE-LTF 910 may be used for channel estimation of the STA. That is, the STA may perform channel estimation on the basis of the HE-LTF 910 included in the NDP frame, and may generate a feedback frame on the basis of a result of the channel estimation.

An HE-SIG B 920 may include information which indicates a PSDU length of 0.

As described above in FIG. 8, an order of some fields included in the aforementioned NDP may be changed. That is, each field of the PPDU header may be located in the order of HE-SIG A, HE-STF, and HE-LTF.

Figure 10:
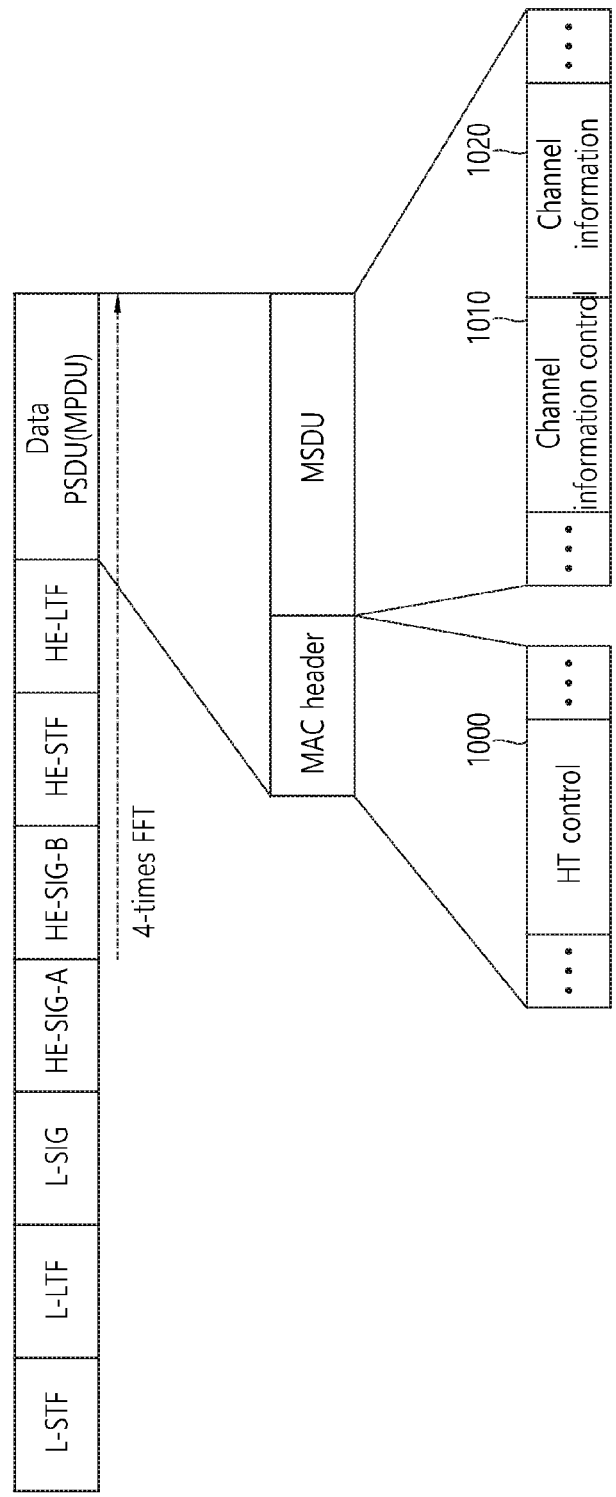
FIG. 10 is a concept view illustrating a feedback PPDU according to an embodiment of the present invention.

FIG. 10 is a concept view illustrating a feedback PPDU according to an embodiment of the present invention.

Referring to FIG. 10, the feedback PPDU may include a PPDU header and a PSDU (or MPDU). The PSDU (or MPDU) of the feedback PPDU may include a feedback frame.

The PPDU header of the feedback PPDU may include a legacy part and a non-legacy part. Each field included in the legacy part and the non-legacy part may perform a role described above in FIG. 8 for the feedback PPDU.

A MAC header of the feedback frame may include an HT control field 1000, and the MSDU may include a channel information control field 1010 and a channel information field 1020. If beamforming is not used in the sounding procedure as described above, the channel information control field 1010 and the channel information field 1020 may not be included in the feedback frame or may be reserved, and the feedback frame may include only the HT control field 1000. Only when the beamforming is used in the sounding procedure, the feedback frame may include the channel information control field 1010 and the channel information field 1020.

The HT control field 1010 may include an MCS feedback (MFB) field. The MFB field may include information N_STS regarding the number of recommended space-time streams, information MCS regarding a recommended MCS index, information BW regarding a bandwidth size intended by a recommended MCS, and information regarding an average SNR measured on all space-time streams and sub-carriers for transmitting data.

Table 2 and Table 3 show a format of the channel information control field 1010 and the channel information field 1020.

Table 2 below discloses information included in the channel information control field 1010.

TABLE 2

| Subfield | Description |
| --- | --- |
| Nc index | Inidicate a value obtained by subtracting 1 from the number Nc of columns of a beamforming feedback matrix<br>Set to 0 if Nc = 1<br>Set to 1 if Nc = 2<br>. . .<br>Set to 7 if Nc = 8 |
| Nr index | Inidicate a value obtained by subtracting 1 from the number Nrc of rows of a beamforming feedback matrix<br>Set to 0 if Nc = 1<br>Set to 1 if Nc = 2<br>. . .<br>Set to 7 if Nc = 8 |
| Channel bandwidth | Indicate a size of a channel bandwidth measured for generation of a beamforming feedback matrix<br>Set to 0 if 20 MHz<br>Set to 1 if 40 MHz<br>Set to 2 if 80 MHz<br>Set to 3 if 160 MHz or 80 + 80 MHz |
| Grouping, Ng | Inidicate subcarrier grouping used for a beamforming feedback matrix<br>Set to 0 if Ng = 1 (no grouping)<br>Set to 1 if Ng = 2<br>Set to 2 if Ng = 4<br>(3 is reserved) |
| Codebook information | Inidicate a size of codebook entries |
| Feedback type | Inidicate whether it is beamforming feedback for SU-MIMO or beamforming feedback for MU-MIMO |
| Sounduing sequence | Sequency number from NDPA for requesting feedback |

Table 3 below describes information included in the channel information field 1020.

TABLE 3

| Subfield | Description |
| --- | --- |
| SNR(signal to noise ratio) of spatial stream 1 | Average SNR on subcarriers in recipient for spatial stream 1 |
| . . . | . . . |
| SNR of spatial stream Nc | Average SNR on subcarriers in recipient for spatial stream Nc |
| Beamforming feedback matrix (subcarrier index 0) | Order of angles for determining beamforming feedback matrix for corresponding subcarrier |
| Beamforming feedback matrix (subcarrier index 1) | Order of angles of beamforming feedback matrix for corresponding subcarrier |
| . . . | . . . |
| Beamforming feedback matrix (subcarrier index Ns) | Order of angles of beamforming feedback matrix for corresponding subcarrier |
| SNR(signal to noise ratio) of subband 1 | Average SNR on subcarrier included in subband 1 in recipient |
| . . . | . . . |
| SNR of subband Nk | Average SNR on subcarrier included in subband Nk in recipient |

Information of the channel information field 1020 disclosed in Table 3 may be interpreted on the basis of information included in the channel control field 1010 disclosed in Table 2. For example, the AP may receive a feedback frame, and a subcarrier index Ns may be determined on the basis of channel bandwidth information and grouping information of the channel information control field 1010.

According to another embodiment of the present invention, in the grouping field Ng, a reserved 3(0x11) may be used for a subband-unit feedback. If the grouping field Ng is 3, it may indicate the subband-unit feedback. If Ng=3, an SNR or a beamforming feedback matrix (or a matrix vector) may be fed back in a subband unit. For example, a subband unit for a feedback may be fixed in unit of 26 tones or may be set to an additional unit (e.g., a tone corresponding to a multiple unit of 26 tones) on the basis of an additional subband related field.

In addition, an SNR or a beamforming feedback matrix (or a matrix vector) for a full frequency band may be transmitted through a feedback PPDU irrespective of whether grouping is achieved.

In addition, an Nc index count may be defined as not being singular (e.g., Nc) but being plural (e.g., $Nc_1$, $Nc_2$, etc.), and thus a plurality of pieces of feedback information corresponding to the plurality of Nc may be included in the feedback frame.

In an 802.11ac system, a feedback is transmitted using a carrier grouping in order to perform beamforming. Here, the number of used carrier groupings (that is, Ng) is 1, 2, or 4 regardless of a band used for data transmission. On the contrary, an 802.11ax system uses a 4×symbol structure and OFDMA for feedback transmission, as compared with 802.11ac, in order to enhance data transmission. Here, in data transmission using beamforming, a feedback method is necessary to perform efficient beamforming. Thus, the present specification proposes a method of efficiently applying a beamforming feedback tone index and a Q matrix, which is capable of reducing feedback overhead in view of a transmission method of an 802.11ax system. Here, it is assumed that a 1×, 2×, or 4×HE-LTF-applied NDP is used for sounding.

Hereinafter, proposed are a unified feedback mode and Q matrix application method used even in the use of OFDMA as well as the use of a full bandwidth. Feedback tone indexes are symmetric in negative and positive parts. The following description is made based on the negative part. Hereinafter, proposed are a feedback index and Q matrix application method after sounding in an NDP using a 4×HE-LTF and a feedback index and Q matrix application method after sounding in an NDP using a 1×HE-LTF or 2×HE-LTF.

First, a feedback index and Q matrix application method after sounding in an NDP using a 4×HE-LTF is described.

A feedback index and Q matrix application method in a case where Ng is 1 is as follows.

A beamformee performs channel estimation and feeds back channel information through NDP sounding in all subcarriers excluding a guard subcarrier (or guard tone), a DC subcarrier (DC tone), a pilot subcarrier (or pilot tone), and a null subcarrier (or leftover tone). The channel information that is fed back may include channel quality information (CQI), channel directional information (CDI), and the like. A beamformer forms a Q matrix using the information fed back in all subcarriers excluding the guard subcarrier, DC subcarrier, pilot subcarrier, and null subcarrier and applies the Q matrix in data transmission.

A feedback index and Q matrix application method in a case where Ng is 1 or greater is as follows.

For example, subcarriers in a frequency band form groups in Ng excluding a guard subcarrier and a DC subcarrier in a negative part. For example, in a frequency band of 20 MHz, the negative part uses subcarriers (tones) from −122 to −2, subcarriers from −122 are grouped in Ng to form groups, and remaining subcarriers smaller than Ng are grouped to form one group. If Ng is 4, −122 to −119, −118 to −115, . . . , −6 to −3, and −2 each form one group. Here, a feedback subcarrier in each group is the first or last subcarrier in the group. If the first or last subcarrier is a pilot subcarrier or null subcarrier, the previous or following subcarrier is a feedback subcarrier. An 802.11ax system is the most similar to an 802.11ac system but is different from the conventional system in that a pilot subcarrier is located at an even-numbered tone, the location of the pilot subcarrier slightly varies depending on an OFDMA plan, and the index of a feedback subcarrier varies depending on the presence or absence of a null subcarrier. The 802.11ac system may measure a residual carrier frequency offset (CFO) using a pilot. Specifically, the 802.11ac system may allocate the same pilot to the same tone (or subcarrier) in each symbol and may set the same coefficient for the same tone to measure a phase difference between the pilot values of symbols, thereby measuring a residual CFO. In the 802.11ax system, since a CFO is not measured when a pilot subcarrier is located at an odd-numbered tone, a pilot subcarrier is always located at an even-numbered tone. An even-numbered tone corresponds to a subcarrier with an even-numbered subcarrier index.

For another example, subcarriers in a frequency band form groups in Ng excluding a guard subcarrier and a DC subcarrier in a negative part. Here, a feedback subcarrier in each group is the first or last subcarrier in the group. If the first or last subcarrier is a pilot subcarrier or null subcarrier, this group is grouped with the previous or following neighboring group to form one new group. This method allows the group size to increase, so that greater Ng may be actually applied than Ng intended. Therefore, if a channel correlation is not high, performance deterioration may occur.

For another example, since a pilot subcarrier is an even-numbered tone in the 802.11ax system, the following is proposed so that the index of a feedback subcarrier is an odd-numbered tone to prevent the pilot subcarrier from overlapping with the feedback subcarrier. An odd-numbered tone corresponds to a subcarrier with an odd-numbered subcarrier index. Subcarriers in a frequency band form groups in Ng excluding a guard subcarrier and a DC subcarrier in a negative part. Here, a feedback subcarrier in each group is the first or last subcarrier (odd-numbered tone) in the group. If the first or last subcarrier is a null subcarrier, the previous or following subcarrier is a feedback subcarrier (that is, regardless of an even-numbered tone). Feedback subcarriers are less likely to be spaced at an interval of Ng, while the indexes of the feedback subcarriers are not significantly varied by OFDMA plan.

For another example, subcarriers in a frequency band form groups in Ng excluding a guard subcarrier and a DC subcarrier in a negative part. Here, a feedback subcarrier in each group is the first or last subcarrier (odd-numbered tone) in the group. If the first or last subcarrier is a null subcarrier, this group is combined with the previous or following neighboring group of the group including the subcarrier to form one new group. According to this method, feedback subcarriers are less likely to be spaced at an interval of Ng. That is, there is a possibility that higher Ng is actually applied. Therefore, if a channel correlation is not high, performance deterioration may occur.

For another example, when a feedback subcarrier index is allocated in the above manner in the use of OFDMA, one group may belong to two RUs. Here, subcarriers in the group belonging to the two RUs may be divided into subcarriers belonging to the respective RUs, thereby forming two new groups. In a group having no feedback subcarrier, the first or last subcarrier (or the first or last odd-numbered tone) in the group may be used as a feedback subcarrier. Alternatively, the group having no feedback subcarrier is combined with an adjacent group to form one new group.

Further, there may be a group having no feedback subcarrier near a DC subcarrier. In this case, the first subcarrier in the group is used as a feedback subcarrier or the group is combined with an adjacent group to form one new group.

Described is a method of feeding back channel state information and applying a Q matrix based on a feedback subcarrier determined by the above method. A beamformee may perform channel estimation in all subcarriers (excluding a pilot subcarrier and a null subcarrier) in each group to calculate an average channel value in the group and may feed channel information in a feedback subcarrier. Further, the beamformee may feed only channel information estimated in the feedback subcarrier in the feedback subcarrier. A beamformer, which has received the channel information, forms a Q matrix in the feedback subcarrier, and all subcarriers in each group transmit data (or downlink frame) by applying the same Q matrix formed in the feedback subcarrier. When the beamformee calculates the average channel value in the group and feeds back channel information, a smoothing effect may be obtained to improve performance. In addition, when the beamformee feeds only the channel information estimated in the feedback subcarrier, overhead of computation quantity may be reduced, thus being advantageous as compared with the previous method (802.11ac method).

Figure 11:
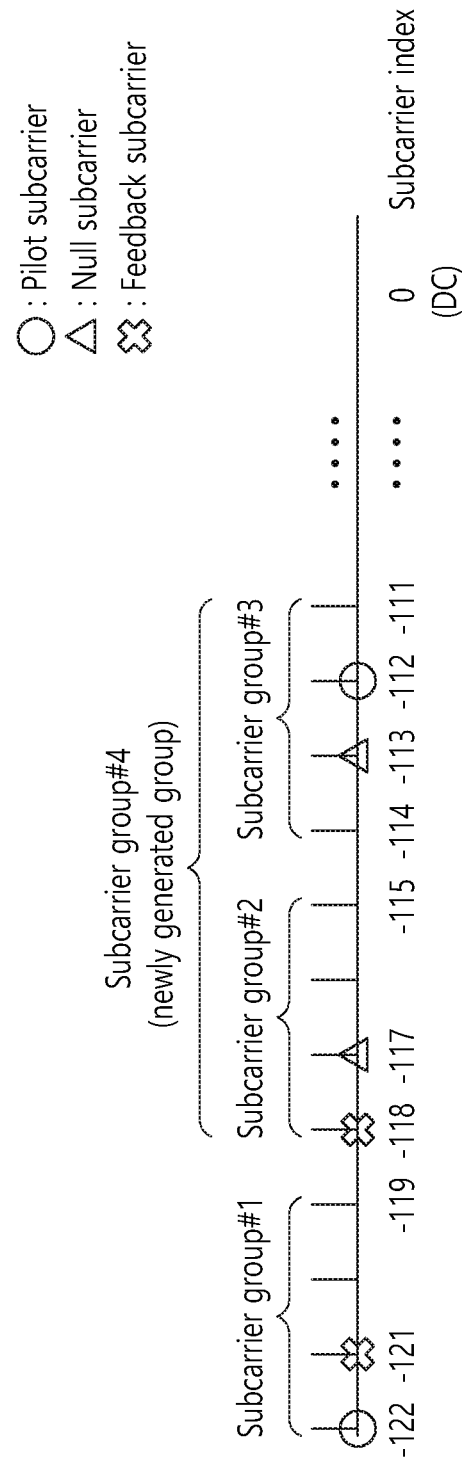
FIG. 11 illustrates an example of determining a feedback subcarrier in each subcarrier group based on an NDP using a 4×HE-LTF according to an embodiment.

The present specification illustrates FIG. 11 for the easier understanding of the above examples.

FIG. 11 illustrates an example of determining a feedback subcarrier in each subcarrier group based on an NDP using a 4×HE-LTF according to an embodiment.

Referring to FIG. 11, subcarriers in a frequency band form groups in Ng excluding a guard subcarrier and a DC subcarrier in a negative part. For example, if a frequency band is 20 MHz and Ng is 4, subcarrier group #1 of subcarriers with subcarrier indexes of −122 to −119, subcarrier group #2 of subcarriers with subcarrier indexes of −118 to −115, and subcarrier group #3 of subcarriers with subcarrier indexes of −114 to −111 may be formed in a negative part.

Since a pilot subcarrier is an even-numbered tone in FIG. 11, the following is proposed so that the index of a feedback subcarrier is an odd-numbered tone to prevent the pilot subcarrier from overlapping with the feedback subcarrier. Basically, a feedback subcarrier in each subcarrier group is the first or last subcarrier (odd-numbered tone) in the subcarrier group. If the first or last subcarrier is a null subcarrier, the previous or following subcarrier is a feedback subcarrier (that is, regardless of an even-numbered tone).

In subcarrier group #1, a pilot subcarrier is located at an even-numbered tone (with a subcarrier index of −122) and a feedback subcarrier is located at the first subcarrier (with a subcarrier index of −121) in subcarrier group #1 among odd-numbered tones. In subcarrier group #2, since the first subcarrier (with a subcarrier index of −117) in subcarrier group #2 among odd-numbered tones is a null subcarrier, a subcarrier (with a subcarrier index of −118) right before the null subcarrier is a feedback subcarrier.

In subcarrier group #3, the first subcarrier (with a subcarrier index of −113) in subcarrier group #3 among odd-numbered tones is a null subcarrier. Therefore, subcarrier group #3 and neighboring subcarrier group #2 may be grouped to generate new subcarrier group #4. That is, in subcarrier group #4, a feedback subcarrier may be a subcarrier with a subcarrier index of −118. That is, since subcarrier group #4 is used, instead of separately using subcarrier group #2 and subcarrier group #3, a group size is increased and greater Ng may be actually applied than Ng (which is 4) intended.

Next, a feedback index and Q matrix application method after sounding in an NDP using a 1×HE-LTF or 2×HE-LTF is described.

A value is loaded every four tones in a 1×HE-LTF and a value is loaded every two tones in a 2×HE-LTF. Accordingly, it is possible that channel estimation is actually performed every four tones in a 1×HE-LTF and every two tones in a 2×HE-LTF. Therefore, it is assumed that Ng is 4 or greater in a 1×HE-LTF and Ng is 2 or greater in a 2×HE-LTF. Actually, it is possible through interpolation to perform channel estimation for a tone of an HE-LTF loaded with no value. However, when data is transmitted by feeding channel information on the tone and forming a Q matrix, performance deterioration becomes more serious. When Ng is less than 4 in a 1×HE-LTF and Ng is less than 2 (that is, 1) in a 2×HE-LTF, it is proposed that Ng is changed to 4 and 2 in the respective cases. A method of allocating a feedback subcarrier and a method of feeding back channel state information and applying a Q matrix are proposed as follows.

For example, subcarriers in a frequency band form groups in Ng excluding a guard subcarrier and a DC subcarrier in a negative part. That is, a feedback subcarrier index is allocated by Ng and Ng subcarriers are grouped to form each one group. For example, when a frequency band is 20 MHz, a 2×HE-LTF is used, and Ng=4, −122, −118, −114, . . . , −2 are allocated as the indexes of feedback subcarriers and −122 to −119, −118 to −115, . . . , −6 to −3, and −2 each form one group. If a subcarrier allocated a feedback subcarrier index is a pilot subcarrier or null subcarrier, another even-numbered tone in a corresponding group is allocated as a feedback subcarrier. Alternatively, the corresponding group is combined with the previous or following neighboring group to form one new group. Further, when there is no another even-numbered tone in the corresponding group or the other even-numbered tone is also a pilot subcarrier or null subcarrier, the corresponding group is combined with the previous or following neighboring group to form one new group.

In addition, when a feedback subcarrier index is allocated in the above manner in the use of OFDMA, one group may belong to two RUs. Here, subcarriers in the group belonging to the two RUs may be divided into subcarriers belonging to the respective RUs, thereby forming two new groups. In a group having no feedback subcarrier, the first subcarrier (or the first even-numbered tone) in the group may be used as a feedback subcarrier. Alternatively, the group having no feedback subcarrier is combined with an adjacent group to form one new group. When there is no first even-numbered tone in a group having no feedback subcarrier, the group is also combined with an adjacent group to form one new group.

Further, there may be a group having no feedback subcarrier near a DC subcarrier. In this case, the group is also combined with an adjacent group to form one new group.

Described is a method of feeding back channel state information and applying a Q matrix based on a feedback subcarrier determined by the above method. A beamformee may perform channel estimation in all subcarriers (excluding a pilot subcarrier and a null subcarrier) in each group to calculate an average channel value in the group and may feed channel information in a feedback subcarrier. Further, the beamformee may feed only channel information estimated in the feedback subcarrier in the feedback subcarrier. A beamformer, which has received the channel information, forms a Q matrix in the feedback subcarrier, and all subcarriers in each group transmit data (or downlink frame) by applying the same Q matrix formed in the feedback subcarrier.

Alternatively, the beamformee feeds only channel information estimated in the feedback subcarrier in the feedback subcarrier, and the beamformer forms a Q matrix only for feedback subcarriers using feedback information. Subsequently, for other subcarriers, the Q matrix formed for the feedback subcarriers is subjected to interpolation, thereby forming a Q matrix to be applied to the other subcarriers. That is, since channel estimation of subcarriers loaded with no value in a 1×HE-LTF and 2×HE-LTF is achieved through interpolation, a Q matrix also needs to be formed via interpolation to achieve performance enhancement.

Figure 12:
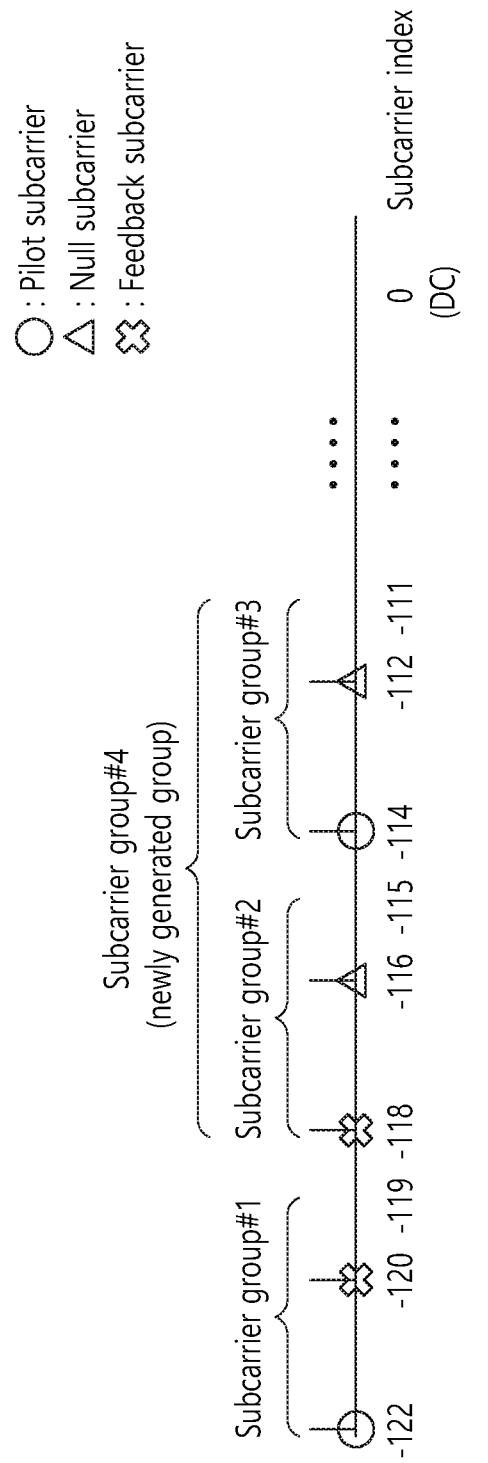
FIG. 12 illustrates an example of determining a feedback subcarrier in each subcarrier group based on an NDP using a 2×HE-LTF according to an embodiment.

The present specification illustrates FIG. 12 for the easier understanding of the above examples.

FIG. 12 illustrates an example of determining a feedback subcarrier in each subcarrier group based on an NDP using a 2×HE-LTF according to an embodiment.

Referring to FIG. 12, subcarriers in a frequency band form groups in Ng excluding a guard subcarrier and a DC subcarrier in a negative part. For example, if a frequency band is 20 MHz and Ng is 4, subcarrier group #1 of subcarriers with subcarrier indexes of −122 to −119, subcarrier group #2 of subcarriers with subcarrier indexes of −118 to −115, and subcarrier group #3 of subcarriers with subcarrier indexes of −114 to −111 may be formed in a negative part. Here, in the 2×HE-LTF, a value is loaded every two tones and channel estimation may be performed every two tones.

In FIG. 12, a feedback subcarrier in each subcarrier group is basically the first or last subcarrier (even-numbered tone) in the subcarrier group. If the first or last subcarrier is a pilot subcarrier or null subcarrier, another even-numbered tone in the subcarrier group may be a feedback subcarrier.

In subcarrier group #1, since a pilot subcarrier is located at an even-numbered tone (with a subcarrier index of −122), a feedback subcarrier is located at another even-numbered tone (with a subcarrier index of −120) in subcarrier group #1.

In subcarrier group #2, a feedback subcarrier is located at the first even-numbered tone (with a subcarrier index of −118) in subcarrier group #2. A null subcarrier is located at another even-numbered tone (with a subcarrier index of −116) in subcarrier group #2 and thus does not affect the location of the feedback subcarrier.

In subcarrier group #3, all even-numbered tones (with subcarrier indexes of −114 and −112) in subcarrier group #3 are pilot subcarriers or null subcarriers. Thus, subcarrier group #3 and neighboring subcarrier group #2 may be grouped to generate new subcarrier group #4.

That is, in subcarrier group #4, a feedback subcarrier may be a subcarrier with a subcarrier index of −118. That is, since subcarrier group #4 is used, instead of separately using subcarrier group #2 and subcarrier group #3, a group size is increased and greater Ng may be actually applied than Ng (which is 4) intended.

Figure 13:
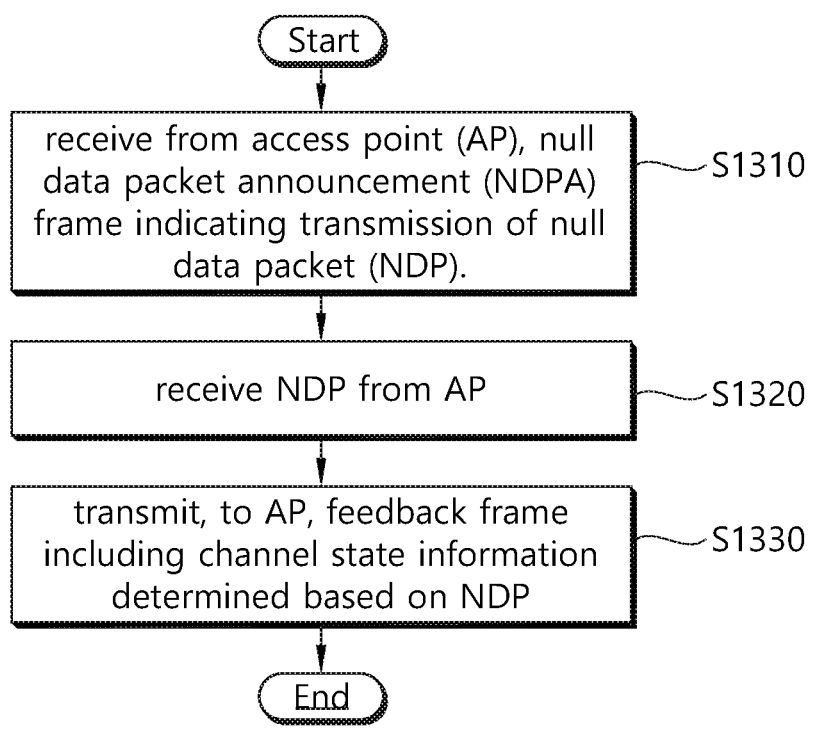
FIG. 13 is a flowchart illustrating a procedure for transmitting a feedback frame based on a sounding procedure according to an embodiment.

FIG. 13 is a flowchart illustrating a procedure for transmitting a feedback frame based on a sounding procedure according to an embodiment.

In operation S1310, an STA receives, from an AP, an NDPA frame indicating the transmission of an NDP.

In operation S1320, the STA receives the NDP from the AP.

In operation S1330, the STA transmits, to the AP, a feedback frame including channel state information determined based on the NDP.

The channel state information indicates a feedback subcarrier in each subcarrier group. That is, the channel state information indicates a location to which the feedback subcarrier in a frequency band is allocated.

Specifically, the subcarrier group is generated based on grouping information using subcarriers in a frequency band excluding a guard subcarrier and a DC subcarrier. The grouping information may correspond to Ng. That is, the subcarriers in the frequency band form groups in Ng excluding the guard subcarrier and the DC subcarrier.

The feedback subcarrier is included in a subcarrier with an odd-numbered subcarrier index. Further, a pilot subcarrier is included in a subcarrier with an even-numbered subcarrier index. Since a pilot subcarrier has an even-numbered subcarrier index in the 802.11ax system, a feedback subcarrier basically has an odd-numbered index so as not to overlap with the pilot subcarrier. Here, if the subcarrier with the odd-numbered subcarrier index is a null subcarrier, the feedback subcarrier corresponds to a subcarrier with an even-numbered subcarrier index, which is adjacent to the subcarrier with the odd-numbered subcarrier index. That is, in this case, it does not matter if the feedback subcarrier has an even-numbered subcarrier index.

Further, if the subcarrier with the odd-numbered subcarrier index is a null subcarrier, the feedback subcarrier is included in a subcarrier group generated by grouping the subcarrier group and an adjacent subcarrier group. That is, the subcarrier group including the null subcarrier is combined with a subcarrier group adjacent to the subcarrier group including the null subcarrier to form one new group. That is, in this case, the feedback subcarrier is included in the new on group.

Further, the channel state information includes average channel information estimated in subcarriers, excluding the null subcarrier and the pilot subcarrier, in the subcarrier group or channel information estimated in the feedback subcarrier. That is, since the former feeds back an average channel information value of all subcarriers (excluding the null subcarrier and pilot subcarrier) in the subcarrier group, a smoothing effect may be obtained to improve performance. Since the latter feeds only the channel information estimated in the feedback subcarrier, it is not necessary to obtain an average channel information value of all subcarriers, thus reducing overhead of computation quantity. The channel state information is transmitted through the feedback subcarrier.

Further, the grouping information is received through the NDPA frame.

Further, the NDP includes a first field area and a second field area. The second field area may include all or some of an HE-STF, an HE-LTF, or the like. The first field area may include all or some fields preceding the HE-STF. For example, the first field area may include an L-LTF, and the second field area may include an HE-LTF. The size of an IFFT applied to the second field area may be twice or four times larger than that of an IFFT applied to the first field area. That is, the foregoing method may use a 2×-LTF or 4×-LTF-applied NDP to perform a sounding procedure.

Figure 14:
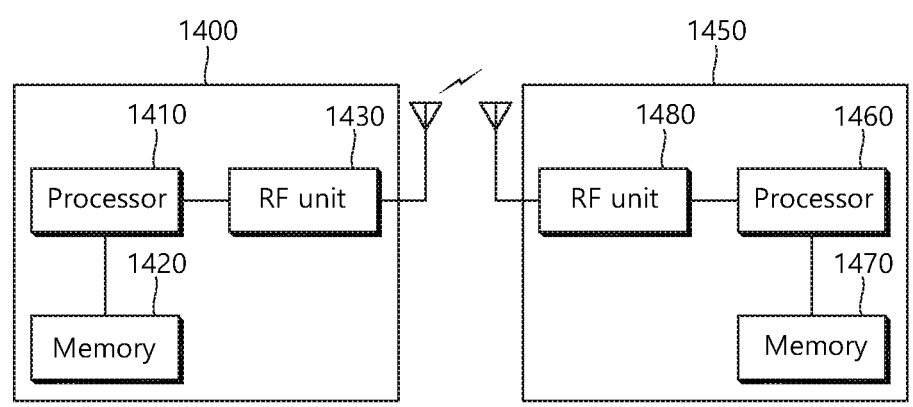
FIG. 14 is a block diagram of a wireless device according to an embodiment of the present invention.

FIG. 14 is a block diagram of a wireless device according to an embodiment of the present invention.

Referring to FIG. 14, as a station (STA) that can realize the above-described exemplary embodiment, the wireless device may correspond to an AP or a non-AP station (non-AP STA). The wireless device may correspond to the above described user or may correspond to a transmitting device transmitting a signal to the user.

The AP 1400 includes a processor 1410, a memory 1420, and a radio frequency unit (RF unit) 1430.

The RF unit 1430 is connected to the processor 1410, thereby being capable of transmitting and/or receiving radio signals.

The processor 1410 implements the functions, processes, and/or methods proposed in this specification. For example, the processor 1410 may be realized to perform the operations according to the above-described exemplary embodiments of the present invention. More specifically, the processor 1410 may perform the operations that can be performed by the AP, among the operations that are disclosed in the exemplary embodiments of FIG. 1 to FIG. 13.

The non-AP STA 1450 includes a processor 1460, a memory 1470, and a radio frequency unit (RF unit) 1480.

The RF unit 1480 is connected to the processor 1460, thereby being capable of transmitting and/or receiving radio signals.

The processor 1460 may implement the functions, processes, and/or methods proposed in the exemplary embodiment of the present invention. For example, the processor 1460 may be realized to perform the non-AP STA operations according to the above-described exemplary embodiments of the present invention. The processor may perform the operations of the non-AP STA, which are disclosed in the exemplary embodiments of FIG. 1 to FIG. 13.

The processor 1410 and 1460 may include an application-specific integrated circuit (ASIC), another chip set, a logical circuit, a data processing device, and/or a converter converting a baseband signal and a radio signal to and from one another. The memory 1420 and 1470 may include a read-only memory (ROM), a random access memory (RAM), a flash memory, a memory card, a storage medium, and/or another storage device. The RF unit 1430 and 1480 may include one or more antennas transmitting and/or receiving radio signals.

When the exemplary embodiment is implemented as software, the above-described method may be implemented as a module (process, function, and so on) performing the above-described functions. The module may be stored in the memory 1420 and 1470 and may be executed by the processor 1410 and 1460. The memory 1420 and 1470 may be located inside or outside of the processor 1410 and 1460 and may be connected to the processor 1410 and 1460 through a diversity of well-known means.

What is claimed is:

1. A method of transmitting a feedback frame based on a sounding procedure in a wireless local area network (WLAN) system, the method performed by a station (STA) and comprising:

receiving, from an access point (AP), a null data packet announcement (NDPA) frame indicating transmission of a null data packet (NDP);

receiving the NDP from the AP in response to NDPA; and transmitting, to the AP, a feedback frame comprising channel state information (CSI) determined based on the received NDP, wherein the CSI indicates a first feedback subcarrier in a first subcarrier group and a second feedback subcarrier in a second subcarrier group, wherein the first subcarrier group and the second subcarrier group are generated based on grouping information using subcarriers in a frequency band excluding a guard subcarrier and a DC subcarrier, wherein the first feedback subcarrier is included in subcarriers in the first subcarrier group having an odd-numbered subcarrier index, and wherein the second feedback subcarrier is included in subcarriers in the second subcarrier group having an even-numbered subcarrier index that are adjacent to subcarriers having an odd-numbered subcarrier index when the subcarriers having the odd-numbered subcarrier index include a null subcarrier.

2. The method of claim 1, wherein:

a fourth subcarrier group is generated by grouping the second subcarrier group and a third subcarrier group that is adjacent to the second subcarrier group if there is no feedback subcarrier in the third subcarrier group; and the second feedback subcarrier is included in the fourth subcarrier group.

3. The method of claim 1, wherein a pilot subcarrier is included in subcarriers in the first subcarrier group having an even-numbered subcarrier index.

4. The method of claim 3, wherein the CSI comprises either average channel information estimated in subcarriers in the first or second subcarrier group excluding the null subcarrier and a pilot subcarrier or channel information estimated in the feedback subcarrier.

5. The method of claim 4, wherein the CSI is transmitted through the first or second feedback subcarrier.

6. The method of claim 1, wherein the grouping information is received through the NDPA frame.

7. The method of claim 1, wherein:

the NDP comprises a first field area and a second field area;

the first field area comprises a Legacy-Long Training Field (L-LTF);

the second field area comprises a High Efficiency-LTF (HE-LTF); and an inverse fast Fourier transform (IFFT) applied to the second field area has a size twice or four times a size of an IFFT applied to the first field area.

8. A wireless device transmitting a feedback frame in a wireless local area network system (WLAN) system, the wireless device comprising:
- a radio frequency (RF) unit configured to transmit and receive a radio signal; and
- a processor operatively coupled with the RF unit, the processor is configured to:
- control the RF unit to receive, from an access point (AP), a null data packet announcement (NDPA) frame indicating transmission of a null data packet (NDP);
- control the RF unit to receive the NDP from the AP in response to the NDPA, and
- control the RF unit to transmit, to the AP, a feedback frame comprising channel state information (CS) determined based on the received NDP,
- wherein the CSI indicates a first feedback subcarrier in a first subcarrier group and a second feedback subcarrier in a second subcarrier group,
- wherein the first subcarrier group and the second subcarrier group are generated based on grouping information using subcarriers in a frequency band excluding a guard subcarrier and a DC subcarrier,
- wherein the first feedback subcarrier is included in subcarriers in the first subcarrier group having an odd-numbered subcarrier index, and
- wherein the second feedback subcarrier is included in subcarriers in the second subcarrier group having an even-numbered subcarrier index that are adjacent to subcarriers having an odd-numbered subcarrier index when the subcarriers having the odd-numbered subcarrier index include a null subcarrier.

9. The wireless device of claim 8, wherein:
- a fourth subcarrier group is generated by grouping the second subcarrier group and a third subcarrier group that is adjacent to the second subcarrier group if there is no feedback subcarrier in the third subcarrier group; and
- the second feedback subcarrier is included in the fourth subcarrier group.

10. The wireless device of claim 8, wherein a pilot subcarrier is included in subcarriers in the first subcarrier group having an even-numbered subcarrier index.

11. The wireless device of claim 10, wherein the CSI comprises either average channel information estimated in subcarriers in the first subcarrier group excluding the null subcarrier and a pilot subcarrier or channel information estimated in the feedback subcarrier.

12. The wireless device of claim 11, wherein the CSI is transmitted through the first or second feedback subcarrier.

13. The wireless device of claim 8, wherein the grouping information is received through the NDPA frame.

14. The wireless device of claim 8, wherein:
- the NDP comprises a first field area and a second field area;
- the first field area comprises a Legacy-Long Training Field (L-LTF);
- the second field area comprises a High Efficiency-LTF (HE-LTF); and
- an inverse fast Fourier transform (IFFT) applied to the second field area has a size twice or four times a size of an IFFT applied to the first field area.

* * * * *